US007254472B2

(12) United States Patent
Larsen et al.

(10) Patent No.: US 7,254,472 B2
(45) Date of Patent: Aug. 7, 2007

(54) COORDINATED TORQUE CONTROL SECURITY METHOD AND APPARATUS

(75) Inventors: John F. Larsen, Campbellcroft (CA); Gene Dimarco, Cobourg (CA); Timothy J. Hartrey, Brighton, MI (US); Tom C. Ender, Behtany (CA)

(73) Assignee: General Motors Corporation, Detroit, MI (US)

( * ) Notice: Subject to any disclaimer, the term of this patent is extended or adjusted under 35 U.S.C. 154(b) by 175 days.

(21) Appl. No.: 11/054,678

(22) Filed: Feb. 9, 2005

(65) Prior Publication Data

US 2006/0178797 A1    Aug. 10, 2006

(51) Int. Cl.
*B60T 8/00* (2006.01)
*F02D 35/00* (2006.01)

(52) U.S. Cl. .......................... 701/54; 477/107; 701/53
(58) Field of Classification Search ................ 701/51, 701/52, 155, 53, 54, 66, 67, 68, 154; 477/107, 477/101, 120, 121, 106, 109, 125, 129; 74/335, 74/336 R
See application file for complete search history.

(56) References Cited

U.S. PATENT DOCUMENTS 5,018,383 A * 5/1991 Togai et al. ............... 73/118.1

| 5,019,989 | A | * | 5/1991 | Ueda et al. .................. 701/104 |
| 5,073,865 | A | * | 12/1991 | Togai et al. ................. 701/103 |
| 5,151,861 | A | * | 9/1992 | Danno et al. .................. 701/90 |
| 5,479,811 | A | * | 1/1996 | Baumann et al. ............ 73/1.37 |
| 5,519,617 | A | * | 5/1996 | Hughes et al. ................ 701/84 |
| 5,855,533 | A | | 1/1999 | Tolkacz et al. |
| 5,941,923 | A | * | 8/1999 | Fischer et al. ................ 701/53 |
| 6,513,492 | B1 | | 2/2003 | Bauerle et al. |
| 2004/0034460 | A1 | | 2/2004 | Folkerts et al. |

OTHER PUBLICATIONS

Paul G. Griffiths; "Embedded Software Control Design for an Electronic Throttle Body"; Michigan Technological University, Copyright 2002; pp. 1-108.

* cited by examiner

*Primary Examiner*—Dalena Tran

(57) ABSTRACT

A method of preventing undesirable vehicle behavior in a vehicle torque control system that includes determining an expected axle torque based on a vehicle speed, a powerplant profile, an accelerator pedal position and/or a cruise control signal. The method also includes estimating an actual axle torque of a powerplant based on a powerplant maximum torque, a throttle position and powertrain inefficiencies and converting the expected axle torque to an expected acceleration and the actual axle torque to an actual acceleration based on a wheel radius and a road load. The method further includes regulating a torque output of a powerplant when a rate-of-change in a difference between the expected acceleration and the estimated actual acceleration is greater than a first threshold.

30 Claims, 3 Drawing Sheets

COORDINATED TORQUE CONTROL SECURITY METHOD AND APPARATUS

FIELD OF THE INVENTION

The present invention relates to vehicle control systems, and more particularly relates to regulation of torque by a coordinated torque security control.

BACKGROUND OF THE INVENTION

Vehicle manufactures produce a range of vehicle powerplants including internal combustion engines, electric machines powered by fuel cells and/or electrical cells and hybrid vehicles having multiple powerplants. Vehicle manufacturers also produce a range of powertrains that are driven by one or more powerplants.

Powerplants and the powertrains are equipped with control modules that control the vehicle based on an array of inputs. Traditional control is vehicle specific and based on the powerplant and the powertrain configuration. Adapting the control to alternative powerplants and powertrains requires additional vehicle specific modules. As a result, vehicle manufacturers maintain a variety of control modules for a variety of vehicle models, and for the various configurations of the powerplant and the powertrain found in the vehicle.

Moreover, traditional control regulates torque with vehicle-specific feedback loops between a throttle blade, a mass flow sensor and an engine speed. The variety of vehicle-specific control modules and integration of different powerplants and powertrain configurations requires increases in cost and complexity.

SUMMARY OF THE INVENTION

A method of preventing undesirable vehicle behavior in a vehicle torque control system that includes determining an expected axle torque based on a vehicle speed, a powerplant profile, an accelerator pedal position and/or a cruise control signal. The method also includes estimating an actual axle torque of a powerplant based on a powerplant maximum torque, a throttle position and powertrain inefficiencies and converting the expected axle torque to an expected acceleration and the actual axle torque to an actual acceleration based on a wheel radius and a road load. The method further includes regulating a torque output of a powerplant when a rate-of-change in a difference between an expected acceleration and an estimated actual acceleration is greater than a first threshold.

In one feature, the method includes comparing the actual axle torque to an idle range.

In other features, the method includes regulating the torque output when the actual axle torque is not within the idle range during a first time period after the vehicle control system detects an idle torque request.

In other features, the method includes detecting the idle torque request from one of the accelerator pedal position and a cruise control signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application or uses. As used herein, the term module, submodule, controller, and/or device refers to an application specific integrated circuit (ASIC), an electronic circuit, a processor (shared, dedicated, or group) and memory that executes one or more software or firmware programs, a combinational logic circuit, or other suitable components that provide the described functionality. Moreover, vehicle controllers may communicate with various vehicle systems using digital or analog inputs and outputs and/or an automotive communications network including, but not limited to, the following commonly used vehicle communications network standards: CAN, SAE J1850, and GMLAN.

The present invention can be configured to integrate with and/or rely upon a coordinated torque control system of various vehicles, where a mechanical linkage between an accelerator pedal and an engine throttle has been replaced. An exemplary coordinated torque control system is disclosed in commonly assigned United States Patent Application Publication Number US 2004/00344460, titled Powertrain Control System, filed Aug. 13, 2002 and is hereby incorporated by reference in its entirety.

Figure 1:
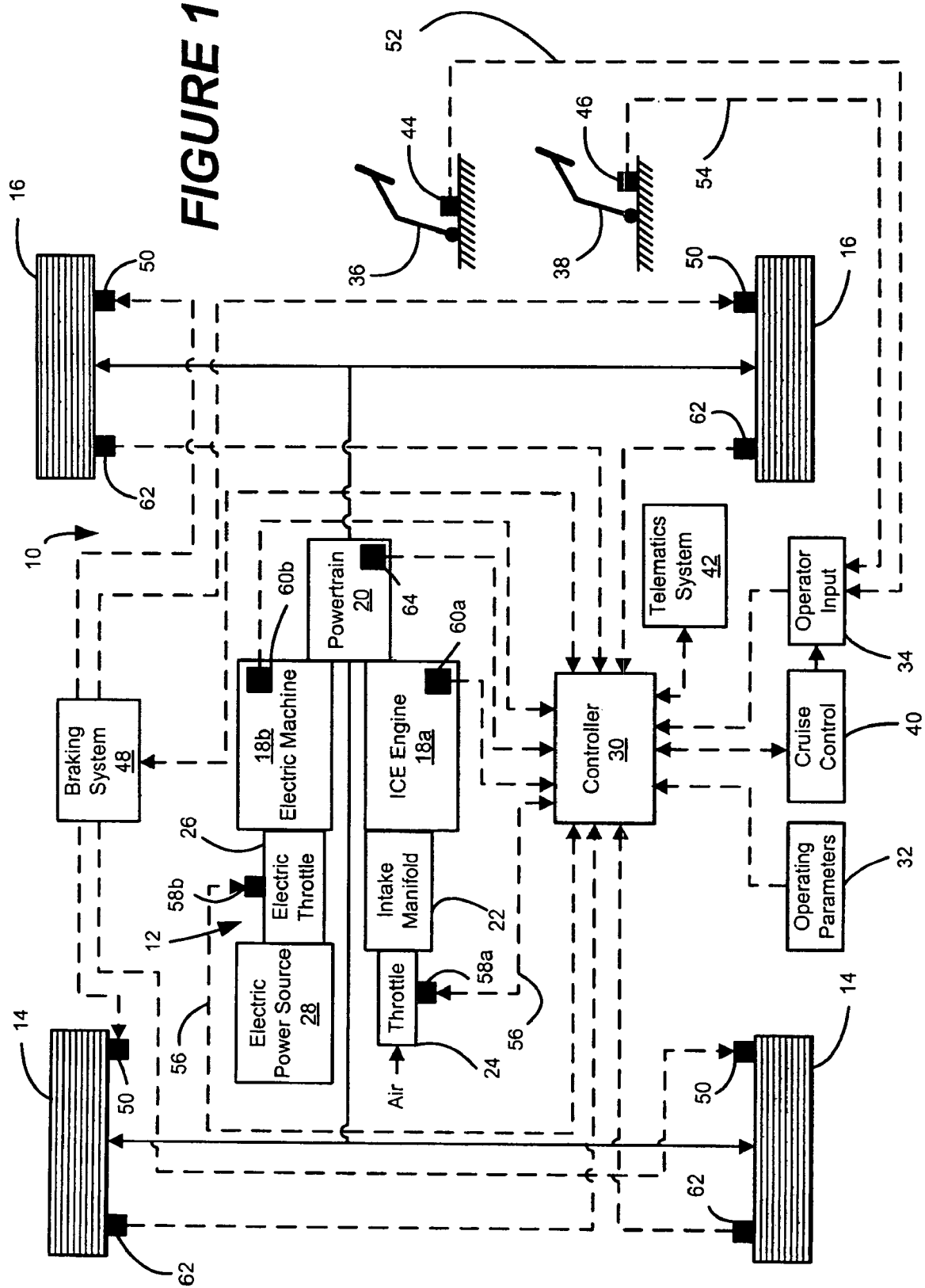
FIG. 1 is a schematic diagram illustrating a vehicle including a controller constructed in accordance with the teachings of the present invention.

Referring now to FIG. 1, a vehicle 10 includes an engine system 12, driven wheels 14 and optionally-driven wheels 16. The engine system 12 produces a torque output to drive the driven wheels 14. The engine system 12 includes an internal combustion engine 18a and an electric machine 18b integrated in a hybrid configuration to drive a powertrain 20. It will be appreciated that the engine system 12 can be configured with a variety of powerplants 18a, 18b and powertrains 20 such as but not limited to fuel cell and/or battery powered electric machines, internal combustion engines such as diesel, biomass, gasoline, and natural gas consuming engines, and hybrid combinations thereof. The powertrain 20 can be configured to connect one or more of the powerplants 18a, 18b to the driven wheels 14 and/or the optionally-driven wheels 16.

The internal combustion engine 18a includes an intake manifold 22 and a throttle 24. Air flow into the intake manifold 22 is regulated by the throttle 24. The air is distributed into cylinders (not shown) of the internal combustion engine 18a. Air is mixed with fuel and combusted within the cylinders to produce a torque output from the internal combustion engine 18a. The electric machine 18b includes an electric throttle 26 and an electric power source 28 such as batteries or a fuel cell. The electric throttle 26 regulates the current sent to the electric machine 18b, thereby controlling a torque output of the electric machine 18b. It will be appreciated that additional engines and/or electric machines can be used in the vehicle 10, as well as a single engine and/or electric machine configuration.

A controller 30 controls overall operation of the vehicle 10 is based on various vehicle operating parameters 32 and operator inputs 34. While a single controller 30 is shown, one or more controllers may be implemented. Furthermore, the controller 30 may include various submodules. The vehicle operating parameters 32 can include environmental indicators such as humidity, temperature or air pressure. The vehicle operating parameters 32 can also include a powerplant profile and a powerplant status that indicates, for example, a cold engine signal or controller faults. The powerplant profile can include lookup data that indicates, for example, a maximum brake torque output and torque output based on spark retardation and effects of the environmental indicators. The operator inputs 34 can include an accelerator pedal 36, a brake pedal 38, a cruise control system 40 and other controls that, for example, provide additional accessibility for disabled drivers. A telematics system 42, such as OnStar® can also provide input and receive output from the controller 30.

The accelerator pedal 36 is movable between a plurality of positions, which are detected by an accelerator pedal position sensor 44. Generally, the accelerator pedal 36 is positioned to regulate the power output of the engine system 12. The brake pedal 38 is similarly movable between a plurality of positions, which are detected by a brake pedal position sensor 46. Generally, the brake pedal 38 is positioned to regulate a braking system 48 that reduces the speed of the vehicle 10. The braking system 48 engages a plurality of braking components 50 such as calipers to clamp brake rotors (not shown) attached to the wheels 14, 16. The cruise control system 40 can be optionally engaged to control the speed of the vehicle 10 by various control systems known to one skilled in the art.

The accelerator pedal position sensor 44 generates an acceleration pedal position signal 52 that is communicated to the controller 30. Similarly, the brake pedal position sensor 46 generates a brake pedal position signal 54 that is also communicated to the controller 30. The controller 30 generates a throttle control signal 56 that is sent to one or more throttle actuators 58. An internal combustion engine throttle actuator 58a regulates the throttle 24 and an electric throttle actuator 58b regulates the electric machine throttle 26. An engine speed sensor 60a and an electric machine speed sensor 60b generate speed signals for the internal combustion engine 18a and the electric machine 18b, respectively, which are communicated to the controller 30. Wheel speed sensors 62 generate wheel speed signals and a powertrain speed sensor 64 generates a powertrain speed signal, both of which are communicated to the controller 30. The controller 30 calculates a vehicle speed based on the wheel speed signals. Additionally, the controller 30 calculates a wheel slip as the difference between the wheel speed of the driven wheels 14 and the wheel speed of the optionally-driven wheels 16.

As described in further detail below, the engine system 12 is controlled by the controller 30 and modeled as a torque or a power generation servo that delivers torque or power to propel the vehicle 10. Moreover, the controller 30 controls the engine system 12 as a torque or power servo that operates in concert with a powertrain 20, which operates as a ratio servo to modify the torque or power based on powertrain inefficiencies. As such, the architecture of the controller 30 is not powerplant- or powertrain-component specific. As such, the controller 30 can be configured to include the powerplant profiles, powerplant maximum brake torque and road load based wheel and aerodynamic configurations.

The coordinated torque security control is based on certain state variables that define the performance of the vehicle 10, one or more powerplants 18 and the powertrain 20. The state variables include, but are not limited to, torque, speed, acceleration, jerk and/or power, which all serve as inputs to the controller 30 and can be included in the operating parameters 32. Moreover, the controller 30 includes powerplant profiles providing estimates of the state variables at certain powerplant speeds and during various conditions. Jerk can include, for example, engine speed mismatch and subsequent engine loading when an automatic step gear transmission changes gears. This engine loading can be telegraphed to the vehicle occupants. Further explanation of the state variables and the prediction and estimation thereof, are disclosed in commonly assigned U.S. Pat. No. 5,855,533, entitled Automotive Powertrain Control, issued Jan. 5, 1999, which is hereby incorporated by reference in its entirety.

The state variables are independent of the individual components used to produce the torque, such as spark, air mass, fuel mass, engine gas recycling, clutch pressures and/or other similar variables known to one skilled in the art. By estimating and predicting the state variables and detecting various operating parameters 32, the security control can estimate an actual torque output. Moreover, the security control can predict, thus determine, an expected torque output. The security control is able to regulate the torque output of the powerplant by estimating and determining the torque output. This type of control provides desired performance in terms of state-variable response-trajectory shapes, fuel economy and emissions along with prevention of unintended vehicle acceleration and improper responses to idle torque requests.

Figure 2:
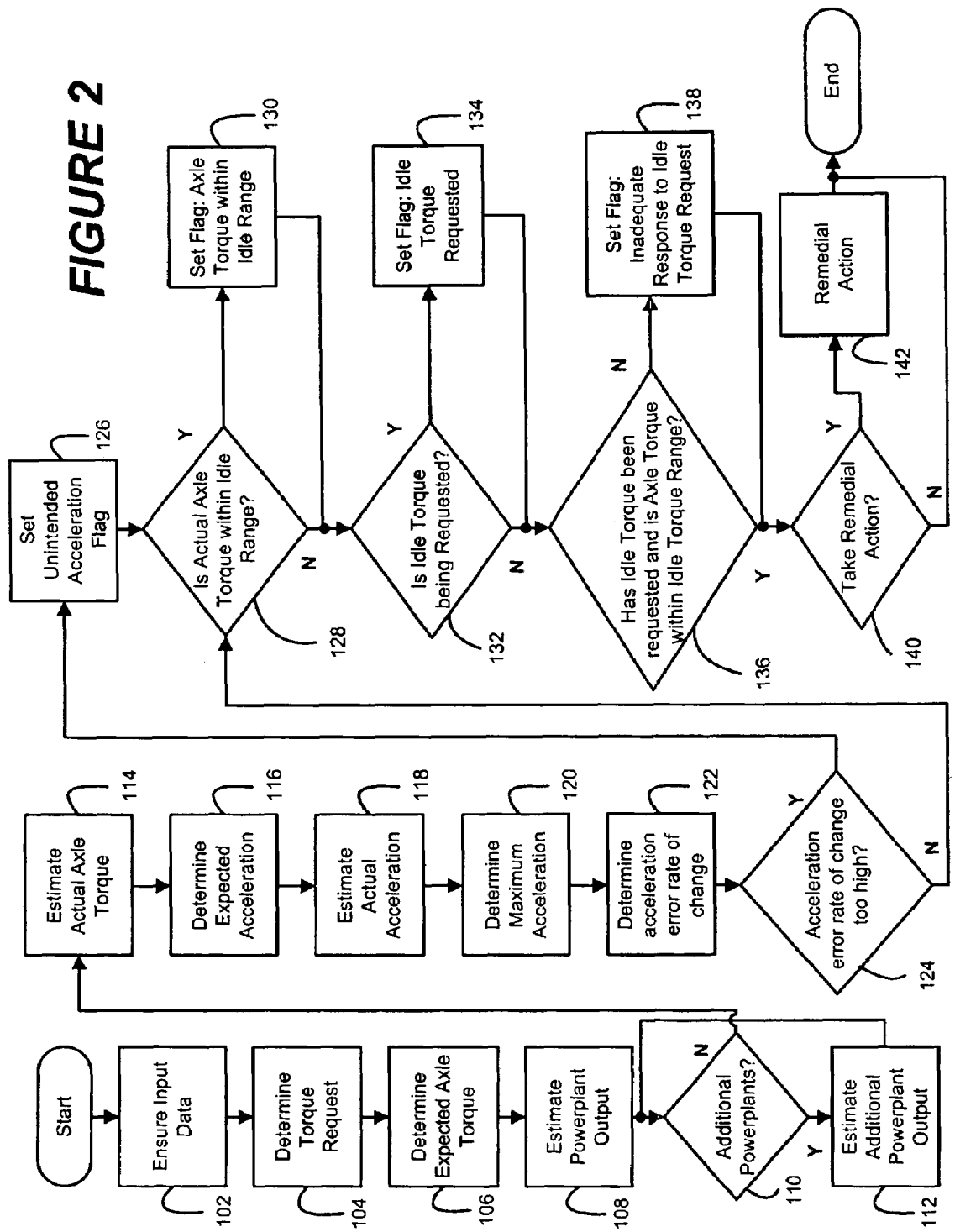
FIG. 2 is a flowchart illustrating an exemplary coordinated torque security control according to the present invention.

With reference to FIG. 2, the coordinated torque security control prevents undesirable vehicle behavior by detecting and reacting to an idle torque request and excessive and/or unintended rates of change in vehicle acceleration. In step 102, control checks the data to ensure its integrity for use by downstream processes. The data includes driver history, driver attributes and other operating parameters. It will be appreciated that the data checked in step 102 depends on the particular configurations of the vehicle 10, the engine system 12 and the controller 30. In step 102, control can also filter or smooth data as needed.

In step 104, control determines a driver torque request based on data from operating parameters 32 and the operator input 34. The driver torque request can include a driver command or a cruise control command. In step 106, control determines an expected axle torque based on the driver torque request and a determination of the ability of one or more of the powerplants 18 and the powertrain 20 to respond based on the powerplant profile and vehicle speed. Control is also based on an accelerator pedal position or a cruise control signal. An exemplary system that determines an expected torque output of a powerplant and powertrain is discussed more fully in commonly assigned U.S. patent application Ser. No. US 2004/00344460, titled Powertrain Control System already incorporated by reference.

In step 108, control estimates an actual axle torque based on engine inefficiencies, a powerplant maximum torque and an engine speed. The estimate of the torque output from the powerplant is based on engine speed, the environmental indicators and a level of spark retardation. In the case of one of the powerplants being an internal combustion engine, the inefficiencies include, but are not limited to, inertial, frictional, accessory and pumping losses due to the peripheral components of the internal combustion engine. In the case of one of the powerplants being an electric engine, the engine speed can be defined as a current draw, which is proportional to a torque output.

In step 110, control determines whether other powerplants are included in the engine system 12. If other powerplants are included in the engine system 12, control continues in step 112. If no other powerplants are included, control continues in step 114. In step 112, the actual axle torque is determined by taking into account the additional powerplants. In the case of one of the powerplants being an electric machine, exemplary inefficiencies include inertial, frictional and accessory losses due to the peripheral components of the electric machine. In step 114, control determines an estimated actual axle torque by subtracting losses due to transmission inefficiencies from the estimated torque output from each powerplant, as determined in steps 108 and 112. Transmission inefficiencies include but are not limited to inefficiencies in a torque converter, a transmission pump and other powertrain components.

In step 116, control determines an expected vehicle acceleration by converting the expected axle torque to a gross vehicle propulsive force. This conversion is based on a wheel or rolling radius of the tires and other vehicle parameters. The gross vehicle propulsive force is converted to a net vehicle propulsive force by subtracting a calculated road load from the gross vehicle propulsive force. The calculated road load includes vehicle rolling losses and aerodynamic drag. The gross vehicle propulsive force is converted to the expected acceleration by using Newton's Second Law (F=ma) based on the known mass and force. In step 118, control estimates acceleration by converting estimated actual axle torque to a gross vehicle propulsive force, similar to that of step 116. The gross vehicle propulsive force is converted to a net vehicle propulsive force by subtracting a calculated road load from the gross vehicle propulsive force. The gross vehicle propulsive force is converted to the actual acceleration by using Newton's Second Law (F=ma) based on the known mass and force.

In step 120, control determines maximum acceleration based on engine speed, the powerplant profile and the other operating parameters 32. The maximum acceleration determination can serve as a boundary for other calculations, such that if an expected or estimated actual acceleration is in excess of the maximum acceleration, control resorts to the maximum acceleration. In step 122, control determines an acceleration error rate-of-change based on the change in the difference between the estimated actual acceleration and the expected acceleration. The acceleration error rate-of-change is compared to a pre-determined calibrated threshold stored in the controller 30. In step 124, if the acceleration error rate-of-change exceeds the threshold such that unintended acceleration exists, control continues in step 126. If the acceleration error rate-of-change does not exceed the threshold constant, control continues in step 128 because no unintended acceleration has been detected.

In step 126, control sets a flag to indicate that the rate of change in acceleration error is too high. In step 128, control determines whether the estimated actual axle torque is within an idle range. If the axle torque is within the idle range, control continues in step 130. If the axle torque is not within the idle range, control continues in step 132. Control sets a flag in step 130 to indicate that the estimated actual axle torque is within the pre-determined idle range. In step 132, control determines whether there is an idle torque request. This determination is based on, among other things, the position of the accelerator pedal 36, the brake pedal 38, other operator inputs 34, such as the cruise control 40, the operating parameters 32 and input from the telematics system 42. If there is the idle torque request, control continues in step 134. If there is no request for idle torque, the control continues in step 136.

In step 134, control sets a flag indicating the idle torque request exists. In step 136, control determines whether there has been an inadequate response to the idle torque request. If the response to the idle torque request is not adequate, control continues in step 138. If the response to the idle torque request is adequate, control continues in step 140. The response to the idle torque request is considered adequate when, for example, an idle torque requested flag is first detected and subsequently an actual axle torque within idle range flag is detected within a first time constant, which is vehicle-specific. The response to the idle torque request is considered inadequate when, for example, the idle torque request flag is first detected and subsequently the axle torque within idle range flag is not detected within the first time constant.

In step 138, control sets a flag indicating there is an inadequate response to the idle torque request. In step 140, control determines whether remedial action is required based on whether the flags have been set per steps 126 or 138. The flags 126 or 138 would respectively indicate an unintended change in acceleration or an inadequate response to an idle torque request respectively. If either flag has been set, control continues in step 142. If neither flag has been set, control ends. In step 142, control initiates remedial action and control ends. Remedial action includes, but is not limited to, regulation of axle torque or activation of the braking system 42 to compensate for unintended changes in acceleration and inadequate responses to the idle torque request.

Figure 3:
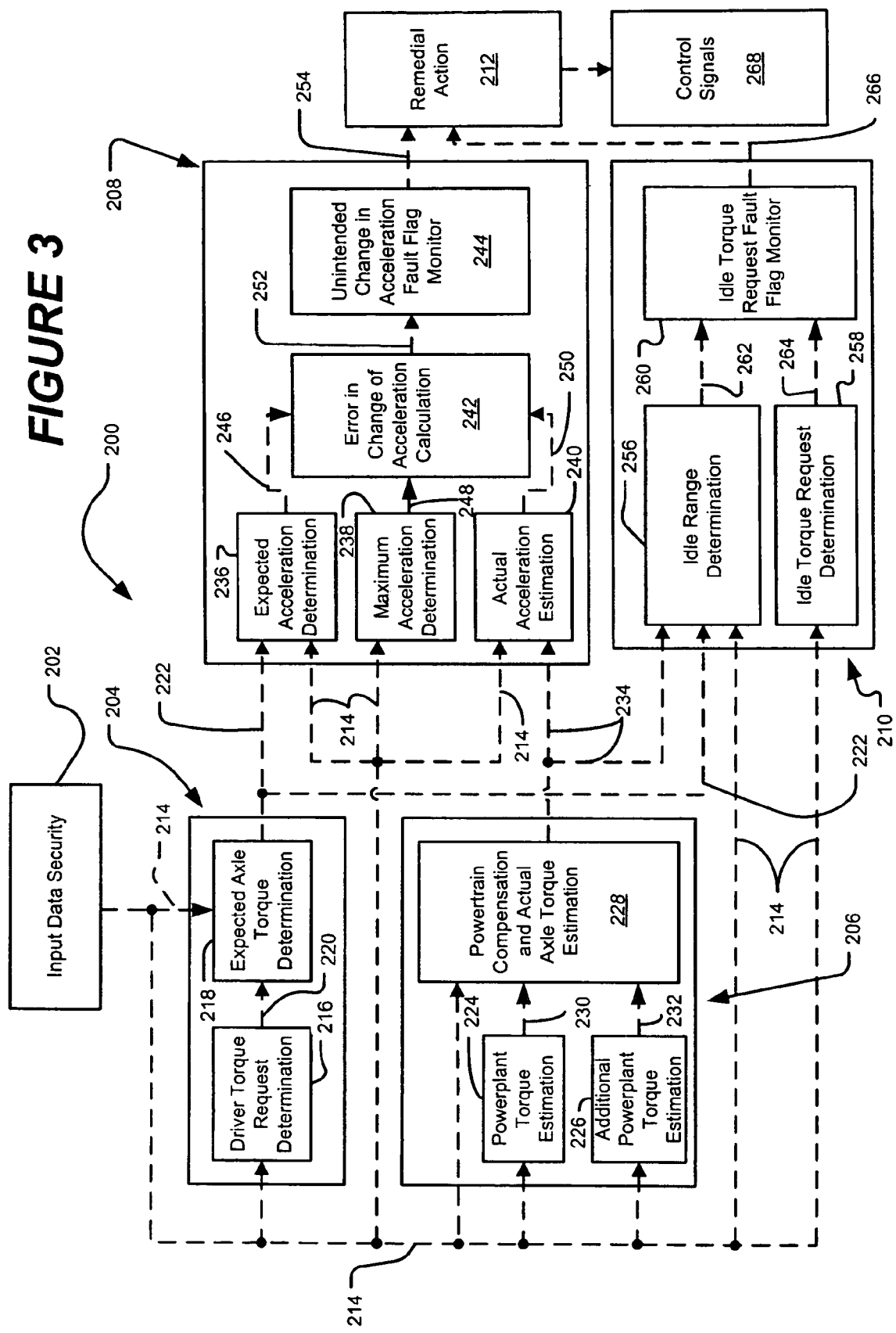
FIG. 3 is an exemplary schematic illustration of modules that execute the coordinated torque security control of the present invention.

With reference to FIG. 3, a block diagram illustrates exemplary modules that execute the coordinated torque security control of the present invention. The modules include an input data security module 202 that communicates with an expected axle torque determination module 204 and an actual axle torque estimation module 206. The input data security module 202 communicates with an unintended vehicle acceleration module 208 and an idle torque request monitor module 210. Both the unintended vehicle acceleration module 208 and the idle torque request monitor module 210 communicate with a remedial action module 212.

The input data security module 202 receives the data processed by the coordinated torque security control of the present invention. The security module 202 is configured to ensure the integrity of all data used by downstream processing. The security module 202 also provides any additional signal conditioning. In this manner, the output of the security module 202 is a secure data set 214 that is suitably scaled or smoothed for use by the expected axle torque determination module 204, the actual axle torque estimation module 206, the unintended vehicle acceleration module 208 and the idle torque request monitor module 210. The input data security module 202 queries other modules to obtain information including, but not limited to, driving conditions, driver history and the operating parameters 32. It will be appreciated that the available information depends on the specific configurations of the vehicle 10.

The expected vehicle axle torque determination module 204 calculates the expected axle torque that is predicted to be delivered based on vehicle speed, a powerplant profile, an accelerator pedal position and a cruise control signal. The expected axle torque determination module 204 includes a driver torque request determination submodule 216 and an expected axle torque determination submodule 218. The driver torque request determination submodule 216 determines the axle torque desired by the driver based on data from the operating parameters 32 and the various operator inputs 34. The accelerator pedal position and communication from the cruise control system 40 are arbitrated. Arbitration includes, for example, choosing a driver command over a cruise control demand when the driver wishes to override the cruise control. A requested axle torque output variable 220 is communicated from the driver torque request determination submodule 216 and is sent to the expected axle torque determination submodule 218.

The expected axle torque determination submodule 218 determines an expected axle torque response variable 222 of the vehicle 10. The expected axle torque response variable 222 is based on the requested axle torque output variable 220 and the powerplant profile that includes the ability of the powertrain and drivetrain to respond to changes in torque requests. The expected axle torque determination submodule 218 communicates the expected axle torque response variable 222 to the unintended vehicle acceleration module 208 and the idle torque request monitor module 210. An exemplary system that predicts torque output based on powerplant and powertrain capabilities is discussed more in fully commonly assigned U. S. patent application Ser. No. US 2004/00344460, entitled Powertrain Control System already incorporated by reference.

The axle torque estimation module 206 includes a powerplant torque estimation submodule 224, an additional powerplant torque estimation submodule 226 and a powertrain compensation submodule 228. The powerplant torque estimation submodule 224 calculates a powerplant torque variable 230 by subtracting inertial, frictional, accessory and pumping loads from an indicated engine torque to account for losses from various powertrain and powerplant components. The powerplant torque variable 230 is communicated from the powerplant torque estimation submodule 224 to the powertrain compensation submodule 228.

Modularity is provided for vehicles equipped with additional and/or alternate sources of torque generation, such as, but not limited to, electric motor or hybrid combinations. The additional powerplant torque estimation submodule 226, for example, can be added as required to model the torque inputs from all sources of torque generation, especially in a multiple powerplant configuration. The powerplant torque estimation submodule 226 calculates an additional powerplant torque variable 232 that is communicated to the powertrain compensation submodule 228.

It will be appreciated that one or more additional powerplant torque estimation submodules 226 can be implemented to provide estimation of the actual axle torque from the various configurations of the engine system 12. It will be further appreciated that additional powerplants can include but are not limited to internal combustion engines, hybrid configurations, electric machines, fuel cell configurations and combinations thereof. Therefore, additional torque determination submodules can be assigned to the additional powerplants. This modularity enables the coordinated torque control security to be used with vehicles having different powerplant and powertrain configurations regardless of the internal components of each configuration. The powerplant torque output variable 230, and one or more additional powerplant torque output variables 232 are communicated to the powertrain compensation submodule 228.

The powertrain compensation submodule 228 receives the powerplant torque output variables 230 and 232 (from one or more of the powerplant torque determination submodules 224 and 226) and calculates an actual axle torque estimation variable 234. The axle torque estimation variable 234 is calculated by determining losses and transmission efficiencies of the torque converter, transmission and other suitable powertrain components. The powertrain compensation submodule 228 communicates the estimated actual axle torque variable 234 to the unintended vehicle acceleration module 208 and the idle torque request monitor module 210.

The unintended vehicle acceleration module 208 detects excessive and/or unintended changes in vehicle acceleration. The unintended vehicle acceleration module 208 includes an expected acceleration determination submodule 236, a maximum acceleration determination submodule 238, an acceleration estimation submodule 240, an error in change of acceleration calculation submodule 242 and an unintended acceleration fault flag monitor submodule 244.

The expected acceleration determination submodule 236 receives the expected axle torque variable 222 from the expected vehicle axle torque determination module 204 and calculates an expected acceleration variable 246. The expected acceleration variable 246 is calculated by converting the expected axle torque variable 222 to a gross vehicle propulsive force, which accounts for, among other things, the rolling radius of the tires. The gross vehicle propulsive force is then converted to a net vehicle propulsive force by subtracting a calculated road load from the gross vehicle propulsive force, which accounts for vehicle rolling losses and aerodynamic drag among other vehicle losses known in the art. The expected acceleration variable 246 is further determined by using Newton's Second Law (F=ma) as the mass and force are known. The expected acceleration determination submodule 236 communicates the expected acceleration variable 246 to the error in change of acceleration calculation submodule 242.

The maximum acceleration determination submodule 238 calculates a maximum acceleration variable 248 based on the powerplant profile, the engine speed, and the operating parameters 32. The maximum acceleration determination submodule 238 communicates the maximum acceleration variable 248 to the error in change of acceleration calculation submodule 242.

The acceleration estimation submodule 240 converts the estimated axle torque variable 234 from the powertrain compensation submodule 228 to an estimated actual acceleration using a similar method used for the expected acceleration determination submodule 236. The actual acceleration estimation submodule 240 sends an acceleration estimation variable 250 to the error in change of acceleration calculation submodule 242.

The error in change of acceleration calculation submodule 242 determines the acceleration error (i.e. the unintended vehicle acceleration), which is determined as the difference between the acceleration estimation variable 250 and the expected acceleration variable 246. The maximum acceleration variable 248 is used to check the accuracy of the actual acceleration estimation variable 250 and the expected acceleration variable 246. From this, a rate-of-change in acceleration error variable 252 is determined and communicated to the unintended acceleration fault flag monitor submodule 244.

The unintended acceleration fault flag monitor submodule 244 compares the rate-of-change in acceleration error variable 252 to a pre-determined or calibrated threshold. If the rate-of-change in acceleration error variable 252 exceeds the threshold, a flag is set to indicate that the rate-of-change in acceleration error is too high. If the unintended acceleration fault flag monitor submodule 244 determines a flag should be set, a flag 254 indicating the acceleration error rate-of-change is too high is sent to the remedial action module 212.

The response to the idle torque request monitor module 210 detects inadequate control system responses to idle torque requests from the driver (not shown), the cruise control system 40 or other automated systems such as, but not limited to, the telematics system 42, like OnStar®. The response to the idle torque request monitor module 210 includes an idle range determination submodule 256, an idle torque request determination submodule 258 and an idle torque request fault flag monitor submodule 260.

The idle range determination submodule 256 evaluates the estimated actual axle torque variable 234 from the actual vehicle axle torque estimation module 206 and determines if the variable 234 is within a pre-determined idle range. If the variable 234 is within the predetermined idle range, the axle torque within idle range determination submodule 256 sends a flag 262 to the idle torque request fault flag monitor submodule 260. The flag 262 indicates that the estimated actual axle torque is within an acceptable idle torque range.

The idle torque request determination submodule 258 evaluates the operator input 34 and the operating parameters 32 to detect the idle torque request. This determination is based on the position of the accelerator pedal 36, the brake pedal 38, the operator inputs 34 such as the cruise control system 40, the operating parameters 32 and/or other inputs from automated systems such as but not limited to the telematics system 42, like OnStar®. If there is the idle torque request, the idle torque request determination submodule 258 sends a flag 264 indicating there is the idle torque request to the idle torque request fault flag monitor submodule 260.

The idle torque request fault flag monitor submodule 260 monitors the flags output from the idle range determination submodule 256 and the idle torque request determination submodule 258. The fault flag submodule 260 first detects the flag 262 from the idle range determination submodule 256. After detecting the flag 262, the fault flag submodule 260 waits to detect the flag 264. If the flag 264 is not detected within a time period, a flag 266 is communicated to the remedial action module 212 indicating that an inadequate response was provided to the corresponding idle torque request. The threshold time can be equal to a stored vehicle-specific time constant.

The remedial action module 212 generates control signals 268 based on either the flag 254, which indicates the acceleration error rate-of-change is too high or the flag 266, which indicates an inadequate response to a request for idle torque. A plurality of remedial actions that are initiated by the control signals 268 can be configured to the various powerplants 18, powertrains 20 and the various configurations thereof. In addition, one or more of the remedial actions can alter or attenuate the operator inputs 34 depending on the various vehicle configurations and operating parameters 32. The remedial actions, for example, can increase or decrease torque output to compensate for unintended changes in acceleration and inadequate responses to idle torque requests. Other exemplary remedial actions include, but are not limited to, activation of the braking system 48, activation of service codes or shutting down on or more powerplants 18 as a protective measure. One type of remedial action could include contacting a customer center through the telematics system 42, like OnStar®.

The coordinated torque security control monitors and provides security to the electromechanical control of the vehicle throttle along with the many variables that affect vehicle performance. The torque output regulation performed by the coordinated torque security control can be monitored and controlled further to avoid unwanted and unintended changes in vehicle acceleration as well as response to idle torque requests that that do not produce an idle pedal position axle torque.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of preventing undesirable vehicle behavior in a vehicle torque control system comprising:
   determining an expected axle torque based on a vehicle speed, a powerplant profile and one of an accelerator pedal position and a cruise control signal;
   estimating an actual axle torque of a powerplant based on a powerplant maximum torque, an engine speed and engine system inefficiencies;
   converting said expected axle torque to an expected acceleration based on a wheel radius and a road load;
   converting said actual axle torque to an actual acceleration based on said wheel radius and said road load; and
   regulating a torque output of a powerplant when a rate-of-change in a difference between said expected acceleration and said actual acceleration is greater than a first threshold.

2. The method of claim 1 further comprising comparing said actual axle torque to an idle range.

3. The method of claim 2 further comprising regulating said torque output when said actual axle torque is not within said idle range during a first time period after said vehicle control system detects an idle torque request.

4. The method of claim 3 further comprising detecting said idle torque request from one of said accelerator pedal position and a cruise control signal.

5. The method of claim 2 further comprising setting an idle range flag when said actual axle torque is within said idle range.

6. The method of claim 5 further comprising setting an idle torque request flag when the vehicle control system detects an idle torque request.

7. The method of claim 6 further comprising regulating said torque output when said idle range flag is not detected during a second time period after said vehicle control system detects said idle torque request flag is set.

8. The method of claim 1 wherein regulating said torque output includes one of setting a service code and reducing said torque output.

9. The method of claim 1 wherein determining said expected axle torque is further based on one of a driver history, a powerplant status and environmental factors.

10. A torque control system for a vehicle, comprising:
    a powerplant that produces a torque output;
    operator inputs including one of an accelerator pedal position and a cruise control signal; and
    a control module that controls said powerplant, that determines an expected axle torque based on a vehicle speed, a powerplant profile and one of an accelerator position and a cruise control signal, that estimates an actual axle torque of a powerplant based on a powerplant maximum torque, an engine speed and engine system inefficiencies, that converts said expected axle torque to an expected acceleration based on a wheel radius and a road load, that converts said actual axle torque to an actual acceleration based on said wheel radius and said road load, and that regulates said torque output of said powerplant when a rate-of-change in the difference between said expected acceleration and said actual acceleration is greater than a first threshold.

11. The torque control system of claim 10 wherein said control module compares said actual axle torque to an idle range.

12. The torque control system of claim 11 wherein said control module regulates said torque output of said powerplant when said actual axle torque is not within said idle range during a first time period after said control module detects an idle torque request.

13. The torque control system of claim 12 wherein said control module detects said idle torque request from one of said accelerator pedal position and a cruise control signal.

14. The torque control system of claim 11 wherein said control module sets an idle range flag when said powerplant torque is within said idle range.

15. The torque control system of claim 14 wherein said control module sets an idle torque request flag when said control module detects an idle torque request.

16. The torque control system of claim 10 wherein said control module regulates said torque output when said idle range flag is not detected during said first time period after said idle torque request flag is set.

17. The torque control system of claim 10 wherein said control module regulates said torque output by one of setting a service code and reducing said torque output.

18. The torque control system of claim 10 wherein said control module further determines said expected axle torque based on one of a driver history, a powerplant status, environmental factors, a brake pedal position and a telematics system signal.

19. A method of preventing undesirable vehicle behavior in a vehicle torque control system comprising:
estimating an actual axle torque of a powerplant based on a powerplant maximum torque, an engine speed and engine system inefficiencies;
comparing said actual axle torque to an idle torque range; and
regulating a torque output of a powerplant when said actual axle torque is not within said idle torque range during a first time period after said vehicle torque control system detects an idle torque request.

20. The method of claim 19 further comprising detecting said idle torque request from one of said accelerator pedal position and a cruise control signal.

21. The method of claim 19 further comprising setting an idle torque range flag when said actual axle torque is within said idle torque range.

22. The method of claim 21 further comprising setting an idle torque request flag when the vehicle control system detects said idle torque request.

23. The method of claim 22 further comprising regulating said torque output when said idle torque range flag is not detected during said first time period said idle torque request flag is set.

24. The method of claim 19 wherein regulating said torque output includes one of setting a service code and reducing said torque output.

25. A torque control system for a vehicle, comprising:
a powerplant that produces a torque output;
operator inputs including one of an accelerator pedal position and a cruise control signal; and
a control module that controls said powerplant, that estimates an actual axle torque of a powerplant based on a powerplant maximum torque, an engine speed and engine system inefficiencies, that compares if said actual axle torque to an idle torque range and that regulates said torque output when said actual axle torque is not within said idle torque range during a first time period after said control module detects an idle torque request.

26. The torque control system of claim 25 wherein said control module detects said idle torque request from one of said accelerator pedal position and a cruise control signal.

27. The torque control system of claim 25 wherein said control module sets an idle torque range flag when said powerplant torque is within said idle torque range.

28. The torque control system of claim 27 wherein said control module sets an idle torque request flag when said control module detects an idle torque request.

29. The torque control system of claim 25 wherein said control module regulates said torque output when said idle torque range flag is not detected during said first time period after said idle torque request flag is set.

30. The torque control system of claim 25 wherein said control module regulates said powerplant torque by one of setting a service code and reducing torque output.

* * * * *